United States Patent [19]

Adachi

[11] Patent Number: 5,712,659
[45] Date of Patent: Jan. 27, 1998

[54] APPARATUS AND METHOD FOR ADJUSTING CONTRAST OF R,G,B SIGNALS

[75] Inventor: Toshiya Adachi, Nagaokakyo, Japan

[73] Assignee: Mitsubishi Denki Kabushiki Kaisha, Tokyo, Japan

[21] Appl. No.: 383,009

[22] Filed: Feb. 3, 1995

[30] Foreign Application Priority Data

Jun. 9, 1994 [JP] Japan .................................. 6-127850

[51] Int. Cl.$^6$ .................................................. H04N 5/202
[52] U.S. Cl. ........................ 345/150; 348/671; 348/678
[58] Field of Search .................................. 348/254, 255, 348/256, 257, 671, 672, 674, 675, 676, 677, 687, 689; 345/150, 153; H04N 5/205, 5/202, 5/52, 5/57, 9/68, 9/77

[56] References Cited

U.S. PATENT DOCUMENTS 4,253,121 2/1981 Avery ......................................... 348/677
4,499,494 2/1985 Dischert et al. ........................... 348/677

FOREIGN PATENT DOCUMENTS 61-46675   3/1986   Japan .
2 258 782  2/1993   United Kingdom .

*Primary Examiner*—John K. Peng
*Assistant Examiner*—Nathan J. Flynn

[57] ABSTRACT

The video signal data of one of the three primary color signals having the maximum level is adjusted with regard to the amplitude level and the DC level thereof in accordance with a predetermined control data. A difference between the adjusted video signal data and a predetermined threshold level is calculated, and the control data is corrected by ones complement of the differential data. The video signal data of the three primary color signals are adjusted respectively, with regard to the amplitude level and DC level thereof in accordance with the corrected control data. In other words, merely with respect to the digital video signal data with the maximum level, the control and brightness controls are conducted. Then, a difference between the resultant video signal data and a predetermined threshold level is obtained for adjusting the respective contrast levels of the three primary color signals by using ones complement of the obtained differential data.

17 Claims, 10 Drawing Sheets

APPARATUS AND METHOD FOR ADJUSTING CONTRAST OF R,G,B SIGNALS

BACKGROUND OF THE INVENTION

1. Field of the Invention

The present invention relates to an image display apparatus for digitally processing a video signal to be displayed on a display screen.

2. Description of Related Art

FIG. 1 is a circuit diagram exemplifying a gamma corrector in a conventional image display apparatus. The gamma corrector of FIG. 1 has buffer circuits 1, 2 and 3 so as to respectively correspond to a red (R) primary color signal, a green (G) primary color signal and a blue (B) primary color signal. The emitters of respective transistors in the buffer circuits 1, 2 and 3 are connected with the base of a transistor in a white peak amplifying circuit 8 via resistances 4, 5 and 6, respectively. The base of the transistor in the white peak amplifying circuit 8 is grounded via a resistance 7. The collector of the transistor in the white peak amplifying circuit 8 is connected with the base of a transistor 901 in a white peak detecting circuit 9. The emitter of the transistor 901 is connected with the base of a transistor 1001 in a gamma drive circuit 10. The emitter of the transistor 1001 is connected with the emitters of transistors 1101, 1201 and 1301 in an R gamma corrector 11, a G gamma corrector 12 and a B gamma corrector 13, respectively. The emitter of the transistor in the buffer circuit 1 is connected with the collector of the transistor 1101 in the R gamma corrector 11, the emitter of the transistor in the buffer circuit 2 is connected with the collector of the transistor 1201 in the G gamma corrector 12, and the emitter of the transistor in the buffer circuit 3 is connected with the collector of the transistor 1301 in the B gamma corrector 13. The emitters of the transistors in the buffer circuits 1, 2 and 3 are connected with the bases of the transistors 1101, 1201 and 1301 via the resistances 4, 5 and 6, respectively.

The operation of such gamma correctors will now be described. R, G and B video signals respectively outputted from the buffer circuits 1, 2 and 3 are added to one another at a ratio determined by the resistances 4, 5, 6 and 7, and subjected to inverting amplification in the white peak amplifying circuit 8. Then, when the base voltage of the transistor 901 in the white peak detecting circuit 9 becomes lower than a voltage $-V_{BE}$ set by the emitter thereof (i.e., a voltage between the base and the emitter of the transistor), the transistor 901 is turned on, thereby setting the emitter voltage of the transistor 901 at the base voltage $V_{BE}$.

When the emitter voltage is decreased by the transistor 901 being turned on, the base voltage of the transistor 1001 in the gamma drive circuit 10 is also decreased. As a result, the emitter voltage of the transistor 1001 is decreased as well, and further, the emitter voltages of the transistors 1101, 1201 and 1301 in the R gamma corrector 11, the G gamma corrector 12 and the B gamma corrector 13, respectively are decreased. When a difference between the decreased emitter voltage and the base voltage exceeds the voltage $V_{BE}$, each of the transistors 1101, 1201 and 1301 is turned on, thereby suppressing the amplitude of each of th R, G and B primary color signals.

Since the conventional gamma corrector adapting an analog signal processing has the above-mentioned configuration, it is disadvantageously necessary to use a great number of multipliers having a large number of gates when this configuration is applied to a digital signal processing.

Further, the gamma correction is generally conducted after a contrast control (i.e., an amplitude level control of a video signal) and a brightness control (i.e., a DC level control of a video signal). In the digital signal processing, however, effective gradations are limited. Accordingly, it is disadvantageous in terms of the gradations to conduct the gamma correction after the contrast and brightness controls.

SUMMARY OF THE INVENTION

One of the objectives of the invention is providing an image display apparatus formed of a digital circuit and capable of conducting gamma correction with a comparatively small circuit scale.

Another objective of the invention is providing an image display apparatus capable of conducting gamma correction without spoiling its ability to display gradations in the digital processing.

In the image display apparatus according to a first embodiment of the invention, digital video signal data of the three primary color signals having a level exceeding a predetermined threshold level are compressed at a predetermined ratio in gamma correctors; a level difference between the video signal data before and after the compression is calculated, regarding each of the three primary color signals; and the video signal data of two of the primary color signals excluding one primary color signal having a maximum level of the data after compression are compressed in sub gamma correctors at a ratio corresponding to a difference between the maximum level and the levels of the two data after compression. Accordingly, it is possible to conduct the gamma correction with a comparatively small circuit scale without affecting the variation in the hue.

In the image display apparatus according to a second embodiment of the invention, digital video signal data of the primary color signals having a level exceeding a plurality of threshold levels are compressed at predetermined ratios, respectively in gamma correctors; a sum of the video signal data after the compression is calculated, regarding each of the three primary color signals; and the video signal data of two of the primary color signals excluding one primary color signal having a maximum level of the sum of the data after compression are compressed in sub gamma correctors at a ratio corresponding to a difference between the maximum level and the levels of the two sums of the data after compression. Accordingly, it is possible to conduct the gamma correction with a comparatively small circuit scale without affecting the variation in the hue.

In the image display apparatus according to a third embodiment of the invention, an amplitude level and a DC level of the video signal data of a primary color signal having a maximum level among the three primary color signals are adjusted at a ratio in accordance with predetermined control data; a level difference between a predetermined threshold level and the level of the video signal data whose amplitude level and DC level have been adjusted and whose level exceeds the predetermined threshold level is calculated; the control data are corrected by ones complement of the obtained level difference; and the amplitude levels of the video signal data of the respective primary color signals are adjusted by the corrected control data. In other words, merely with respect to the video signal data of the primary color signal having the maximum level, the contrast and brightness controls are conducted. Then, a difference between the adjusted level of video signal data and a predetermined threshold level is obtained for adjusting the contrast level of the video signal data of all the primary color signals by using ones complement of the obtained difference. Accordingly, it is possible to conduct the gamma correction with a smaller circuit scale while effectively using its ability to display the gradations.

In the image display apparatus according to a fourth embodiment of the invention, the amplitude level and DC level of the video signal data of a primary color signal having the maximum level are adjusted at a ratio in accordance with a predetermined control data; a difference between the level of the adjusted video signal data and a predetermined threshold level is calculated; the calculated deference is converted by using a conversion table; the control data are corrected by using the converted data; and the amplitude levels of the video signal data of all the primary color signals are adjusted by using the corrected control data. In other words, merely with regard to the digital video signal data of the primary color signal having the maximum level, the contrast and brightness controls are conducted. Then, a difference between the adjusted digital video data and a predetermined threshold level is obtained and then converted by using a conversion table. The contrast levels of the video signal data of all the primary color signals are adjusted by using the converted data. Accordingly, it is possible to conduct the gamma correction with a further smaller circuit scale while effectively using the ability to display the gradations.

In the image display apparatus according to a fifth embodiment of the invention, an amplitude level and a DC level of the video signal data of a primary color signal having the maximum level are adjusted at a ratio in accordance with predetermined control data; respective differences between the level of the adjusted video signal data and a plurality of threshold levels are calculated; the control data are corrected by using ones complement of the sum of the calculated differences; and the amplitude levels of the video signal data of all the primary color signals are adjusted by using the corrected control data. In other words, merely with respect to the digital video signal data of the primary color signal having the maximum level, the contrast and brightness controls are conducted. Then, differences between the adjusted video signal data and a plurality of predetermined threshold levels are respectively obtained, and the contrast level of all the primary color signals are adjusted by using ones complement of the sum of the obtained differences. Accordingly, it is possible to conduct the gamma correction with a further smaller circuit scale while effectively using the ability to display the gradations. In addition, since a plurality of threshold levels are used, the gamma correction can be conducted more smoothly.

In the image display apparatus according to a sixth embodiment of the invention, an amplitude level and a DC level of the video signal data of a primary color signal having the maximum level are adjusted at a ratio in accordance with a predetermined control data; respective differences between the level of the adjusted video signal data and a plurality of predetermined threshold levels are calculated; the control data are corrected by a data obtained by converting the sum of the calculated differences by using a conversion table; and the amplitude levels of the video signal data of all the primary color signals are adjusted by using the corrected control data. In other words, merely with respect to the video signal data of the primary color signal having the maximum level, the contrast and brightness controls are conducted. Then, differences between the adjusted video signal data and a plurality of predetermined threshold levels are respectively calculated, and the contrast levels of all the primary color signals are adjusted by using a data obtained by converting the sum of the differences with a conversion table. Accordingly, it is possible to conduct the gamma correction with a further smaller circuit scale while effectively using the ability to display the gradations. In addition, since a plurality of threshold levels are used, the gamma correction is conducted more smoothly.

In the image display apparatus according to a seventh embodiment of the invention, an amplitude level and a DC level of a total video signal data obtained by summing up digital video signal data of the three primary color signals at a predetermined ratio are adjusted in accordance with a predetermined control data; a difference between the level of the adjusted video signal data and a predetermined threshold level are calculated; the control data is corrected by ones complement of the calculated difference; and the amplitude levels of the video signal data of all the primary color signals are adjusted by using the corrected control data. In other words, with respect to the video signal data obtained by summing up the video signal data of the three primary color signals, the contrast and brightness controls are conducted. Then, a difference between the adjusted video signal data and a predetermined threshold level is calculated, and the contrast levels of all the primary color signals are adjusted by using ones complement of the calculated difference. Accordingly, it is possible to conduct the gamma correction with a further smaller circuit scale while effectively using the ability to display the gradations.

In the image display apparatus according to an eighth embodiment of the invention, the ratio for compressing the difference described in the third or the seventh embodiment is adjusted depending upon the threshold level. In other words, in adjusting the contrast level by using the ones complement of the difference, the compression ratio for the difference is varied depending upon the threshold level. Accordingly, it is possible to suppress distortion caused by excessive correction.

In the image display apparatus according to a ninth embodiment of the invention, an amplitude level and a DC level of a total video signal data obtained by summing up the digital video signal data of all the primary color signals at a predetermined ratio are adjusted in accordance with a predetermined control data; a difference between the level of the adjusted video signal data and a predetermined threshold level are calculated; the control data is corrected by data obtained by converting the calculated difference with a conversion table; and the amplitude levels of the video signal data of all the primary color signals are adjusted by using the corrected control data. In other words, with respect to the video signal data obtained by summing up the video signal data of all the primary color signals, the contrast and brightness controls are conducted. Then, a difference between the level of the adjusted video signal data and a predetermined threshold level is calculated, and the contrast levels of all the primary color signals are adjusted by using a data obtained by converting the difference by using a conversion table. Accordingly, it is possible to conduct the gamma correction with a further smaller circuit scale while effectively using the ability to display the gradations.

In the image display apparatus according to a tenth embodiment of the invention, an amplitude level and a DC level of a video signal data obtained by summing up the digital video signal data of all the primary color signals at predetermined ratio are adjusted in accordance with a predetermined control data; respective differences between the level of the adjusted video signal data and a plurality of threshold levels are calculated; the control data is corrected by ones complement of the sum of the calculated differences; and the amplitude levels of the video signal data of all the primary color signals are adjusted by using the corrected control data. In other words, with respect to the video signal data obtained by summing up the video signal data of all the primary color signals, the contrast and brightness controls are conducted. Then, differences between the level of the adjusted video signal data and a plurality of threshold levels are respectively calculated, and the contrast levels of all the primary color signals are adjusted by using ones complement of the sum of the differences. Accordingly, it is possible to conduct the gamma correction with a further smaller circuit scale while effectively using the ability to display the gradations. In addition, since a plurality of threshold levels are used, the gamma correction can be conducted more smoothly.

In the image display apparatus according to an eleventh embodiment of the invention, the ratios for compressing the respective differences in the fifth or the tenth embodiment are adjusted depending upon the threshold levels. Accordingly, it is possible to suppress distortion caused by excessive correction.

In the image display apparatus according to a twelfth embodiment of the invention, an amplitude level and a DC level of a video signal data obtained by summing up the digital video signal data of all the primary color signals at a predetermined ratio are adjusted in accordance with a predetermined control data; respective differences between the level of the adjusted video signal data and a plurality of threshold levels are calculated; the control data are corrected by data obtained by converting the sum of the calculated differences with a conversion table; and the amplitude levels of the video signal data of all the primary color signals are adjusted by using the corrected control data. In other words, with respect to the video signal data obtained by summing up the video signal data of all the primary color signals, the contrast and brightness controls are conducted. Then, differences between the level of the adjusted video signal data and a plurality of threshold levels are respectively calculated, and the contrast levels of all the primary color signals are adjusted by using a data obtained by converting the sum of the differences with a conversion table. Accordingly, it is possible to conduct the gamma correction with a further smaller circuit scale while effectively using the ability to display the gradations. In addition, since a plurality of threshold levels are used, the gamma correction can be conducted more smoothly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The present invention will now be described in detail referring to the accompanying drawings illustrating the Embodiments thereof.

Embodiment 1

Figure 1:
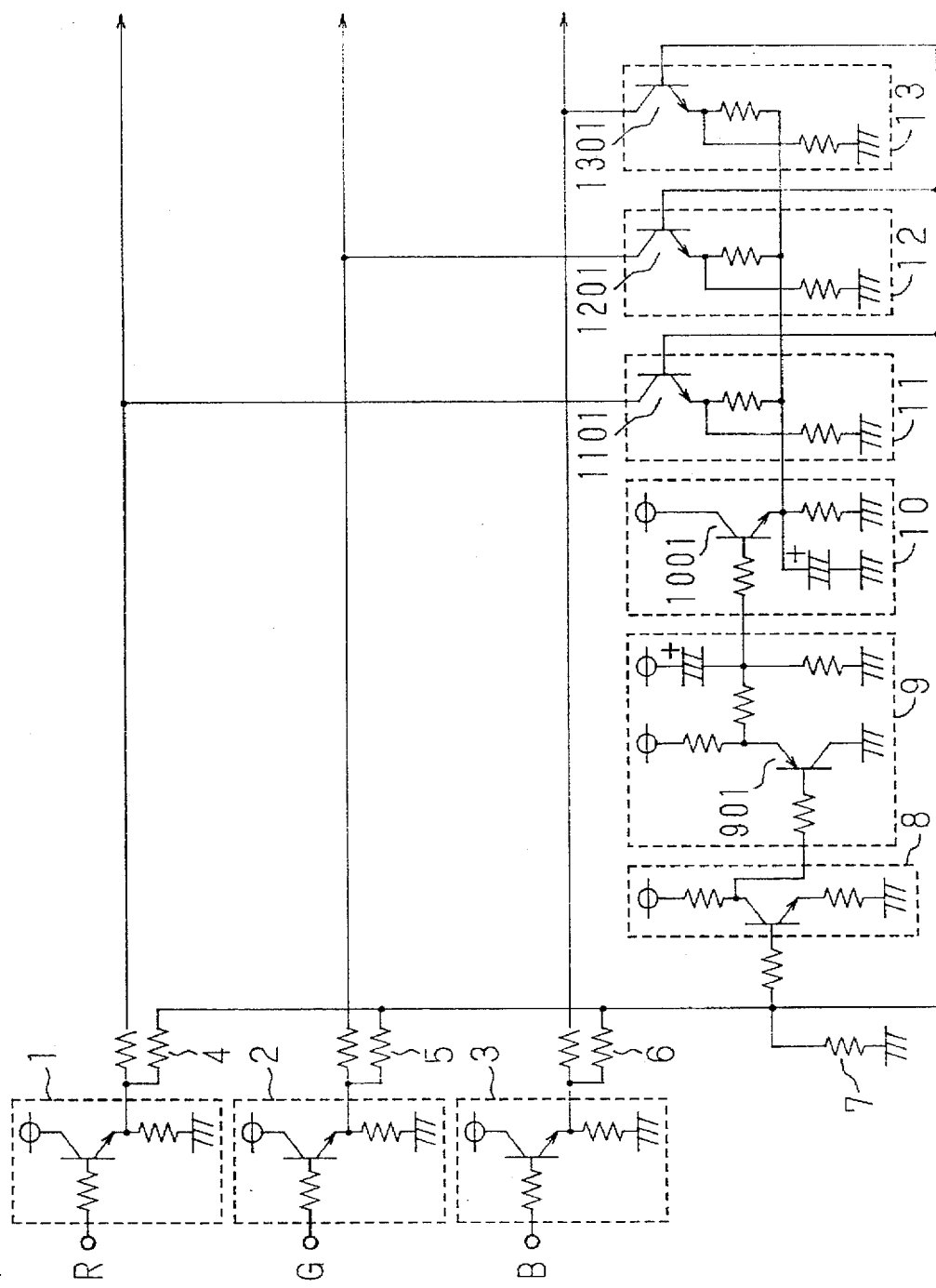
FIG. 1 is a circuit diagram of a gamma corrector in a conventional image display apparatus.
Figure 2:
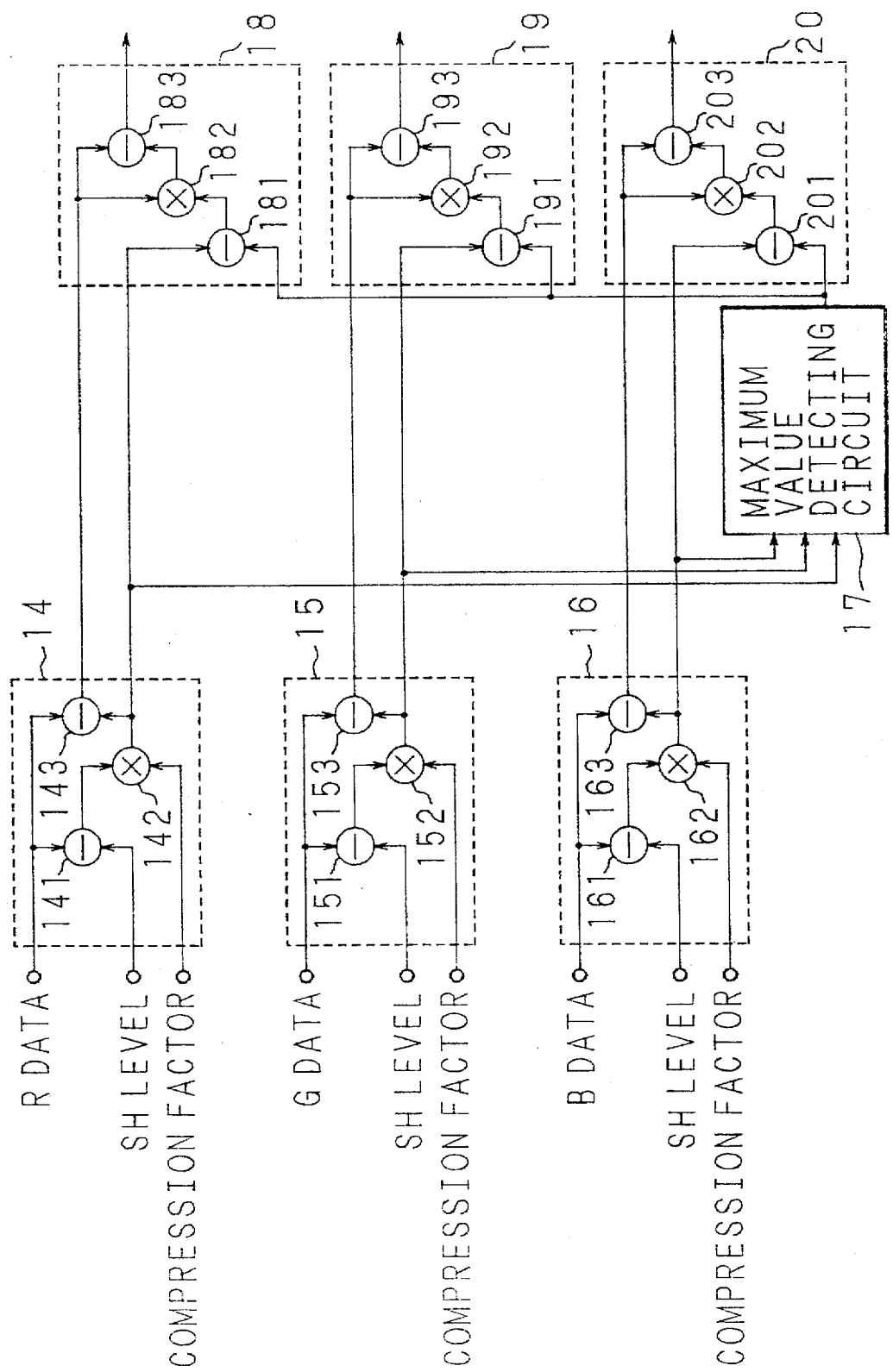
FIG. 2 is a block diagram of the configuration of an image display apparatus according to Embodiment 1 of the invention.

FIG. 2 is a block diagram of the configuration of an image display apparatus according to Embodiment 1 of the invention. In FIG. 2, the numeral 14 denotes an R gamma corrector, which has a subtracter 141 for subtracting data at a predetermined threshold level from video signal data of an R primary color signal inputted thereto, a multiplier 142 for multiplying the output of the subtracter 141 by a compression factor, and a subtracter 143 for subtracting the output of the multiplier 142 from the video signal data of the R primary color signal inputted thereto. Similarly, the numeral 15 denotes a G gamma corrector, which has a subtracter 151 for subtracting data at a predetermined threshold level from video signal data of a G primary color signal inputted thereto, a multiplier 152 for multiplying the output of the subtracter 151 by a compression factor, and a subtracter 153 for subtracting the output of the multiplier 152 from the video signal data of the G primary color signal inputted thereto. Also, the numeral 16 denotes a B gamma corrector, which has a subtracter 161 for subtracting data at a predetermined threshold level from video signal data of a B primary color signal inputted thereto, a multiplier 162 for multiplying the output of the subtracter 161 by a compression factor, and a subtracter 163 for subtracting the output of the multiplier 162 from the video signal data of the B primary color signal inputted thereto. Further, the results of the multiplication by the multipliers 142, 152 and 162 are outputted to a maximum value detecting circuit 17.

The maximum value detecting circuit 17 detects the maximum value among the outputs from the multipliers 142, 152 and 162, and outputs the detected maximum value to an R sub gamma corrector 18, a G sub gamma corrector 19 and a B sub gamma corrector 20. The R sub gamma corrector 18 includes a subtracter 181 for subtracting the output of the multiplier 142 from the output of the maximum value detecting circuit 17, a multiplier 182 for multiplying the output of the subtracter 181 by the output of the subtracter 143, and a subtracter 183 for subtracting the output of the multiplier 182 from the output of the subtracter 143. Similarly, the G sub gamma corrector 19 has a subtracter 191 for subtracting the output of the multiplier 152 from the output of the maximum value detecting circuit 17, a multiplier 192 for multiplying the output of the subtracter 191 by the output of the subtracter 153, and a subtracter 193 for subtracting the output of the multiplier 192 from the output of the subtracter 153. Further, the B sub gamma corrector 20 has a subtracter 201 for subtracting the output of the multiplier 162 from the output of the maximum value detecting circuit 17, a multiplier 202 for multiplying the output of the subtracter 201 by the output of the subtracter 163, and a subtracter 203 for subtracting the output of the multiplier 202 from the output of the subtracter 163.

The operation of such an image display apparatus will now be described. Video signal data of an R primary color signal inputted to the R gamma corrector 14 are first subjected to subtraction of data at a predetermined threshold level by the subtracter 141, and the result is compressed at a predetermined ratio by the multiplier 142. Then, the compressed corrected data are subtracted from the original video signal data by the subtracter 143. Thus, the level correction is performed. Similarly, video signal data of a G primary color signal inputted to the G gamma corrector 15 are subjected to subtraction of data at a predetermined threshold level by the subtracter 151, and the result is compressed at a predetermined ratio by the multiplier 152. The compressed corrected data are subtracted from the original video data by the subtracter 153. Thus, the level correction is performed. Further, video signal data of a B primary color signal inputted to the B gamma corrector 16 are subjected to subtraction of data at a predetermined threshold level by the subtracter 161, and the result is compressed at a predetermined ratio by the multiplier 162. The obtained compressed corrected data are subtracted from the original video data by the subtracter 163. Thus, the level correction is performed.

The compressed corrected data of the respective primary color signals generated in the gamma correctors 14, 15 and 16 (i.e., the outputs of the multipliers 142, 152 and 162) are sent to the maximum value detecting circuit 17, where the maximum value of the compressed corrected data is detected and then sent to the subtracters 181, 191 and 201 in the R sub gamma corrector 18, the G sub gamma corrector 19 and the B sub gamma corrector 20, respectively.

In the R sub gamma corrector 18, a difference between the maximum value of the compressed corrected data selected by the maximum value detecting circuit 17 and the compressed corrected data outputted by the R gamma corrector 14 is calculated by the subtracter 181, the thus obtained differential data is multiplied by the original video signal data of the R primary color signal by the multiplier 182, and the resultant multiplied data are subtracted from the video signal data by the subtracter 183. Thus, the correction is performed.

In the G sub gamma corrector 19, a difference between the maximum value of the compressed corrected data selected by the maximum value detecting circuit 17 and the compressed corrected data outputted by the G gamma corrector 15 is calculated by the subtracter 191. The thus obtained differential data are multiplied by the original video signal data of the G primary color signal by the multiplier 192, and the resultant multiplied data are subtracted from the video signal data by the subtracter 193. Thus, the correction is performed.

In the B sub gamma corrector 20, a difference between the maximum value of the compressed corrected data selected by the maximum value detecting circuit 17 and the compressed corrected data output by the B gamma corrector 16 is calculated by the subtracter 201. The thus obtained differential data are multiplied by the original video signal data of the B primary color signal by the multiplier 202, and the resultant multiplied data are subtracted from the video signal data by the subtracter 203. Thus, the correction is performed.

The gamma correction is thus conducted in Embodiment 1, thereby suppressing the variation in the level ratio among the respective primary color signals.

In this embodiment, a multiplier is used for generating a compressed corrected data. It goes without saying, however, that the data can be compressed by ½, ¼, ⅛, etc. through a bit shift without using a multiplier.

Embodiment 2

Figure 3:
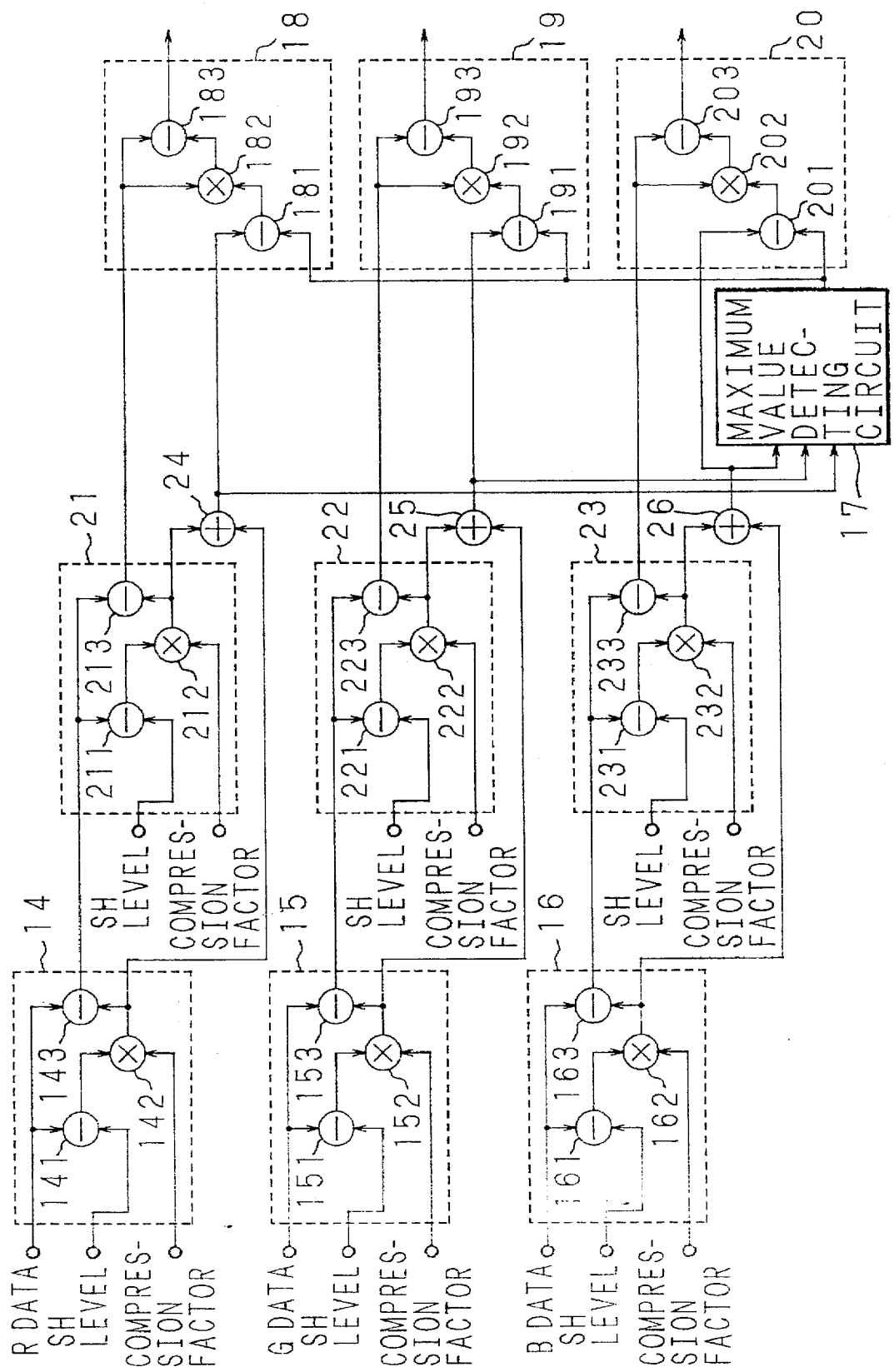
FIG. 3 s a block diagram of the configuration of an image display apparatus according to Embodiment 2 of the invention.

FIG. 3 is a block diagram showing the configuration of an image display apparatus according to Embodiment 2 of the invention, wherein like reference numerals are used for like elements and the description thereof is herein omitted.

As shown in FIG. 3, the numeral 21 denotes a second R gamma corrector, which has a subtracter 211 for subtracting data at a predetermined threshold level from the output of the subtracter 143 in the R gamma corrector 14, a multiplier 212 for multiplying the output of the subtracter 211 by a compression factor, and a subtracter 213 for subtracting the output of the multiplier 212 from the output of the subtracter 143. The threshold level set in the second R gamma corrector 21 is higher than the threshold level set in the R gamma corrector 14. The output of the multiplier 212 is added to the output of the multiplier 142 by an adder 24, and the added data is outputted to the maximum value detecting circuit 17.

The numeral 22 denotes a second G gamma corrector, which has a subtracter 221 for subtracting data at a predetermined threshold level from the output of the subtracter 153 in the G gamma corrector 15, a multiplier 222 for multiplying the output of the subtracter 221 by a compression factor, and a subtracter 223 for subtracting the output of the multiplier 222 from the output of the subtracter 153. The threshold level set in the second G gamma corrector 22 is higher than the threshold level set in the G gamma corrector 15. The output of the multiplier 222 is added to the output of the multiplier 152 by an adder 25, and the added data is outputted to the maximum value detecting circuit 17.

The numeral 23 denotes a second B gamma corrector 23, which has a subtracter 231 for subtracting data at a predetermined threshold level from the output of the subtracter 163 in the B gamma corrector 16, a multiplier 232 for multiplying the output of the subtracter 231 by a compression factor, and a subtracter 233 for subtracting the output of the multiplier 232 from the output of the subtracter 163. The threshold level set in the second B gamma corrector 23 is higher than the threshold level set in the B gamma corrector 16. The output of the multiplier 232 is added to the output of the multiplier 162 by an adder 26, and the added data is outputted to the maximum value detecting circuit 17.

The operation of such an image display apparatus will now be described. Compressed corrected data are generated in the R gamma corrector 14, the G gamma corrector 15 and the B gamma corrector 16 in a manner similar to Embodiment 1 for correcting the video signal data of the respective primary color signals.

The video signal data of the R primary color signal outputted by the R gamma corrector 14 is processed in the second R gamma corrector 21 in the same manner as in the R gamma corrector 14. The video signal data at a predetermined threshold level outputted from the subtracter 143 is subjected to subtraction by the subtracter 211, and the result is compressed at a predetermined ratio by the multiplier 212 for generating a compressed corrected data, which is then subtracted from the video signal data outputted from the subtracter 143 by the subtracter 213. Thus, the correction is performed.

The video signal data of the G primary color signal outputted by the G gamma corrector 15 is processed in the second G gamma corrector 22 in the same manner as in the G gamma corrector 15. The video signal data at a predetermined threshold level outputted from the subtracter 153 is subjected to subtraction by the subtracter 221, and the result is compressed at a predetermined ratio by the multiplier 222 for generating a compressed corrected data, which is then subtracted from the video signal data outputted from the subtracter 153 by the subtracter 223. Thus, the correction is performed.

Further, the video signal data of the B primary color signal outputted by the B gamma corrector 16 is processed in the second B gamma corrector 23 in the same manner as in the B gamma corrector 16. The video signal data at a predetermined threshold level outputted from the subtracter 163 is subjected to subtraction by the subtracter 231, and the resultant is compressed at a predetermined ratio by the multiplier 232 for generating a compressed corrected data, which is then subtracted from the video signal data outputted from the subtracter 163 by the subtracter 233. Thus, the correction is performed.

The compressed corrected data generated in the R gamma corrector 14 and the second R gamma corrector 21 are added to each other by the adder 24 to be sent to the maximum value detecting circuit 17. The compressed corrected data generated in the G gamma corrector 15 and the second G gamma corrector 22 and that generated in the B gamma corrector 16 and the second B gamma corrector 23 are also subjected to the addition by the adders 25 and 26 respectively, to be sent to the maximum value detecting circuit 17. The maximum value detecting circuit 17 detects the maximum value among all the compressed corrected data of the respective primary color signals, and sends the detected data to the R sub gamma corrector 18, the G sub gamma corrector 19 and the B sub gamma corrector 20 respectively.

In the R sub gamma corrector 18, a difference between the maximum value detected by the maximum value detecting circuit 17 among all the compressed corrected data and the compressed corrected data outputted from the adder 24 is calculated by the subtracter 181. The thus obtained differential data are multiplied by the video signal data of the R primary color signal by the multiplier 182, and the multiplied data are subtracted from the video signal data by the subtracter 183 for correction.

In the G sub gamma corrector 19, a difference between the maximum value detected by the maximum value detecting circuit 17 among all the compressed corrected data and the compressed corrected data outputted from the adder 25 is calculated by the subtracter 191. The thus obtained differential data are multiplied by the video signal data on the G primary color signal by the multiplier 192, and the multiplied data are subtracted from the video signal data by the subtracter 193 for correction.

Further, in the B sub gamma corrector 20, a difference between the maximum value detected by the maximum value detecting circuit 17 among all the compressed corrected data and the compressed corrected data outputted from the adder 26 is calculated by the subtracter 201. The thus obtained differential data are multiplied by the video signal data on the B primary color signal by the multiplier 202, and the multiplied data are subtracted from the video signal data by the subtracter 203 for correction.

Because the gamma correction is thus conducted in Embodiment 2, the variation in the level ratio among the respective primary color signals can be suppressed. In addition, the correction is conducted more smoothly than in Embodiment 1 because a plurality of threshold levels are used.

Embodiment 3

Figure 4:
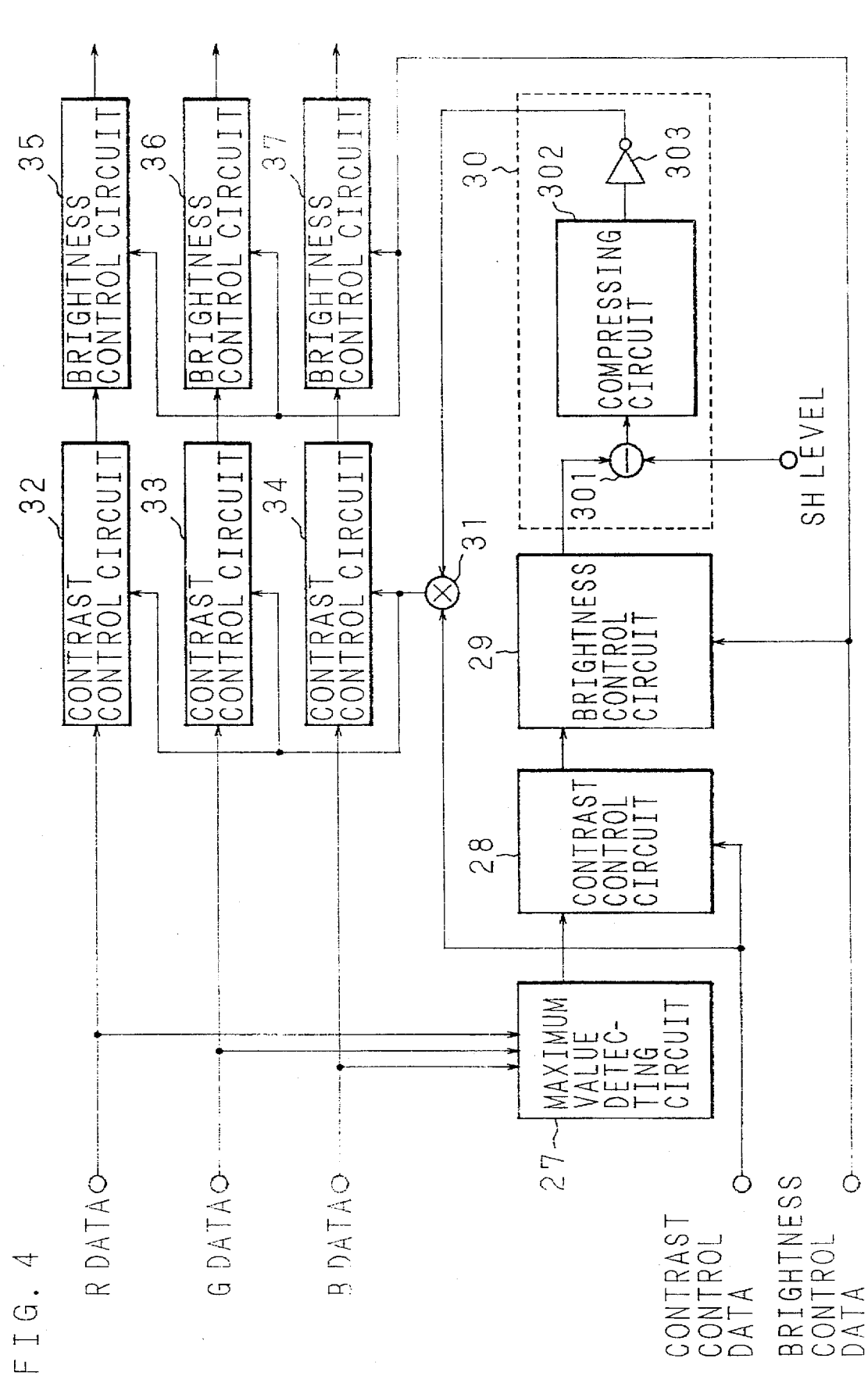
FIG. 4 is a block diagram of the configuration of an image display apparatus according to Embodiment 3 of the invention.

FIG. 4 is a block diagram showing the configuration of an image display apparatus according to Embodiment 3 of the invention. In FIG. 4, the numeral 27 denotes a maximum value detecting circuit, which detects the maximum value in the level among digital video signal data of respective R, G and B primary color signals and outputs the detected video signal data having the maximum level to a contrast control circuit 28. The contrast control circuit 28 adjusts the amplitude level of the received video signal data based on contrast control data and outputs the adjusted data to a brightness control circuit 29. The brightness control circuit 29 adjusts the DC level of the received video signal data based on brightness control data and outputs the adjusted data to a MAX gamma corrector 30.

The MAX gamma corrector 30 has a subtracter 301 for subtracting data at a predetermined threshold level from the received video signal data, a compressing circuit 302 for compressing the output of the subtracter 301, and an inverter 303 for inverting the output of the compressing circuit 302. The data corrected by the MAX gamma corrector 30 is then outputted to a multiplier 31. The multiplier 31 multiplies the received corrected data by the contrast control data, and outputs the multiplied data to contrast control circuits 32, 33 and 34. Each of the contrast control circuits 32, 33 and 34 adjusts the amplitude level of the digital video signal data of each primary color signal based on the output from the multiplier 31, and outputs the adjusted data to brightness control circuits 35, 36 or 37 in a correspondent manner. Each of the brightness control circuits 35, 36 and 37 adjusts the DC level of the digital video signal data of each primary color signal inputted thereto based on the brightness control data.

The operation of such an image display apparatus will be described. The input digital video signal data of the respective R, G and B primary color signals are sent to the maximum value detecting circuit 27, where the video signal data having the maximum level is selected and then sent to the contrast control circuit 28. In the contrast control circuit 28, the received video signal data is multiplied by the contrast control data for adjusting the amplitude level of the video signal. Subsequently, in the brightness control circuit 29, the received data is added to the brightness control data for adjusting the DC level of the video signal.

The resultant adjusted video signal data are sent to the MAX gamma corrector 30, where data at a predetermined threshold level is subtracted from the received video signal data by the subtracter 301, the subtracted data are then compressed by the compressing circuit 302, and each bit of the compressed data is inverted by the inverter 303 for generating the corrected data.

The corrected data is sent to the multiplier 31 to be multiplied by the contrast control data. Then, the resultant data are sent to the contrast control circuits 32, 33 and 34 for the respective R, G and B primary color signals in a correspondent manner. In each of the respective contrast control circuits 32, 33 and 34, the received data are multiplied by the original video signal data for adjusting the amplitude level of the video signal. Subsequently, the adjusted data are sent to the brightness control circuits 35, 36 and 37, respectively, where the received data are added to the brightness control data for adjusting the DC level of the video signal. Accordingly, it is possible to control brightness and contrast without distorting display gradations of an image.

Embodiment 4

Figure 5:
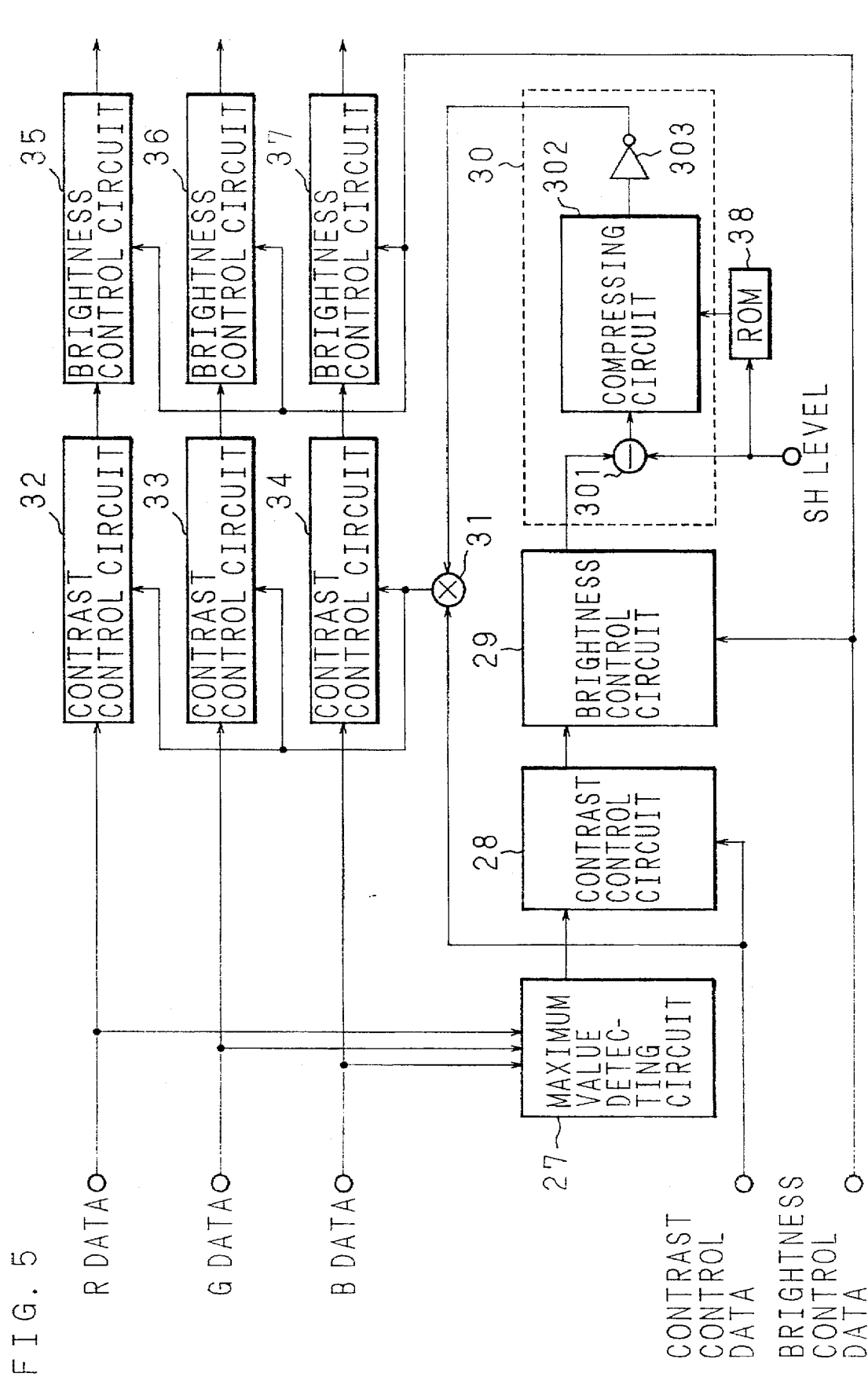
FIG. 5 is a block diagram of the configuration of an image display apparatus according to Embodiment 4 of the invention.

FIG. 5 is a block diagram showing the configuration of an image display apparatus according to Embodiment 4 of the invention, wherein like reference numerals are used for like elements and the description thereof is herein omitted.

In FIG. 5, the numeral 38 denotes a ROM for generating an address compression control data, which outputs, to the compressing circuit 302, data on compression ratio varied depending upon the magnitude of the level of a set threshold level.

The operation of this image display apparatus will now be described. As in Embodiment 3, the video signal data inputted to the MAX gamma corrector 30 are subjected to subtraction of data at a predetermined threshold level by the subtracter 301, and the results are compressed at a predetermined ratio by the compressing circuit 302. At this point, the ROM 38 for receiving the threshold level as an address input is used in this embodiment, and hence, the ROM 38 generates data for controlling the compression ratio according to the magnitude of the threshold level. These control data are sent to the compressing circuit 302, thereby controlling the compression ratio for the differential data outputted from the subtracter 301. Accordingly, the compression control controlled by SH-level can be chosen to be an operation suitable for a given image source. The operation other than this is identical to that of Embodiment 3, and therefore, the description is omitted.

Needless to say, the control data outputted from the ROM 38 for generating the data for controlling the compression ratio can be replaced with other data such as data for selecting a bit shift amount when the compression is conducted by a simple method such as the bit shift without using a multiplier. Further, when the compression ratio is controlled by a microcomputer, such a process can be performed in the microcomputer.

Embodiment 5

Figure 6:
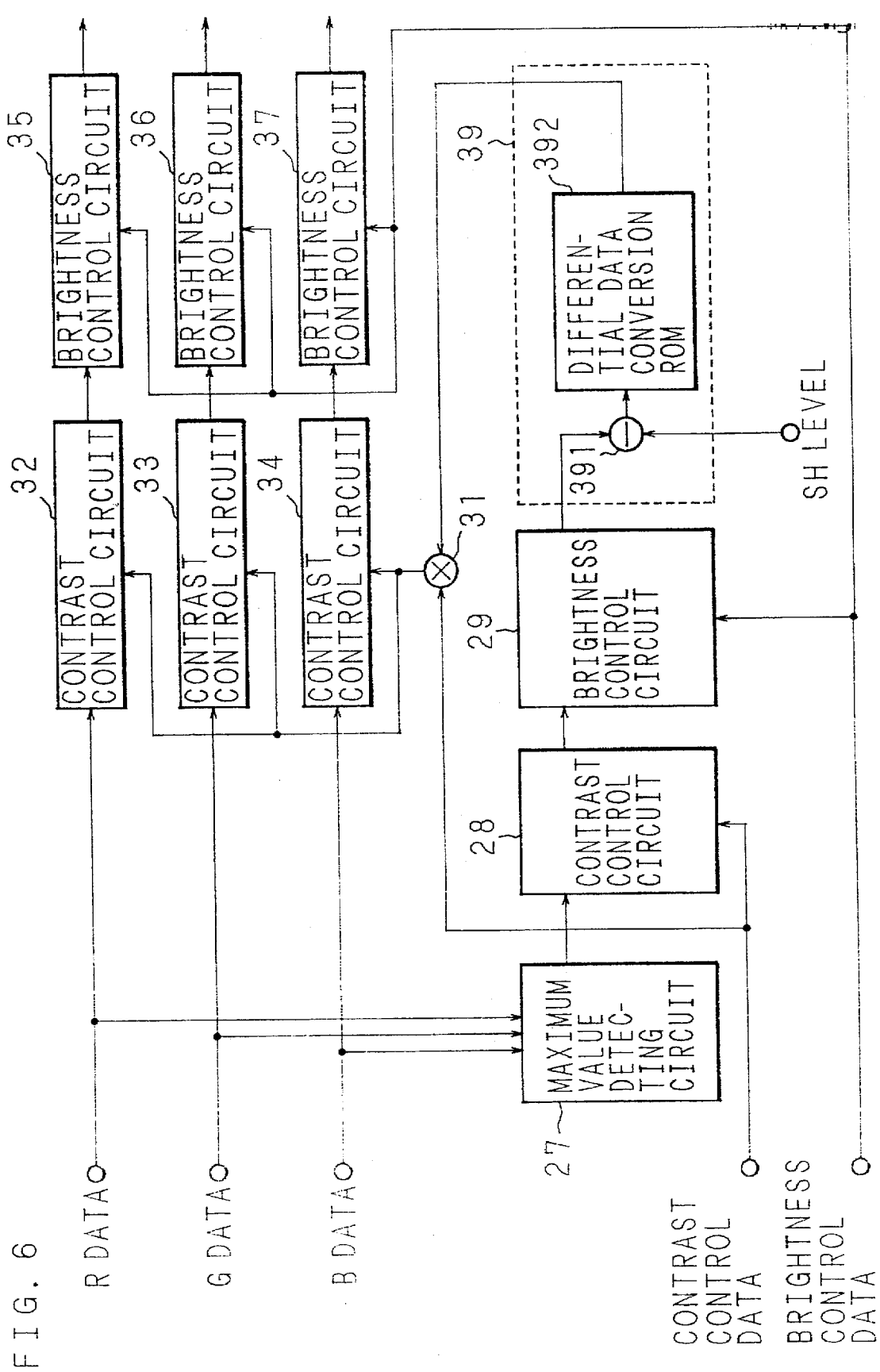
FIG. 6 is a block diagram of the configuration of an image display apparatus according to Embodiment 5 of the invention.

FIG. 6 is a block diagram showing the configuration of an image display apparatus according to Embodiment 5 of the invention, wherein like reference numerals are used for like elements and the description thereof is omitted.

In FIG. 6, the numeral 39 denotes, a MAX gamma corrector, which has a subtracter 391 for subtracting data at a predetermined threshold level from the video signal data outputted from the brightness control circuit 29, and a differential data conversion ROM 392 storing a conversion table for converting the output data of the subtracter 391 into a predetermined corrected data.

The operation of such a display will now be described. The maximum value detecting circuit 27, the contrast control circuit 28 and the brightness control circuit 29 perform the same processing as in Embodiment 3, and the processed video signal data are inputted to the MAX gamma corrector 39. In the MAX gamma corrector 39, the video signal data are subjected to subtraction of data at a predetermined threshold level, and the thus obtained differential data is sent to the address input of the differential data conversion ROM 392. In the differential data conversion ROM 392, the differential data are converted into a predetermined corrected data in accordance with the conversion table stored therein, and the resultant corrected data are sent to the multiplier 31. Accordingly, an optimum compression control characteristic can be easily obtained. The subsequent operation thereon is identical to that in Embodiment 3, and the description thereof is omitted.

Embodiment 6

Figure 7:
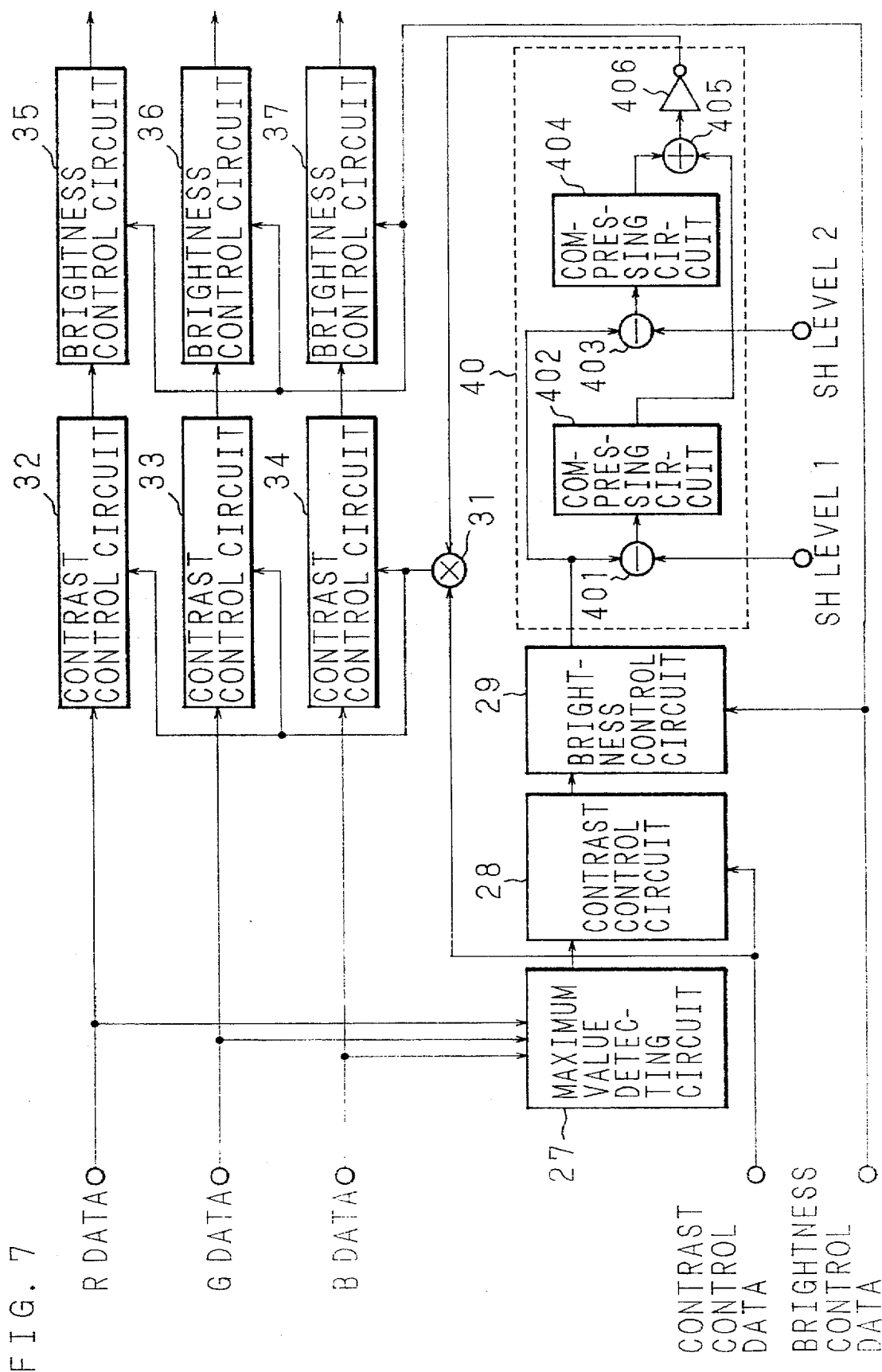
FIG. 7 is a block diagram of the configuration of an image display apparatus according to Embodiment 6 of the invention.

FIG. 7 is a block diagram showing the configuration of an image display apparatus according to Embodiment 6 of the invention, wherein like reference numerals are used for like elements and the description thereof is omitted.

In FIG. 7, the numeral 40 denotes a MAX gamma correction circuit, which has a subtracter 401 for subtracting data at a first threshold level (i.e., SH level 1) from the video signal data outputted from the brightness control circuit 29, a compressing circuit 402 for compressing the output of the subtracter 401, a subtracter 403 for subtracting data at a second threshold level (i.e., SH level 2) from the video signal data outputted from the brightness control circuit 29, a compressing circuit 404 for compressing the output from the subtracter 403, an adder 405 for adding the outputs from the compressing circuits 402 and 404 to each other, and an inverter 406 for inverting the output of the adder 405.

The operation of such a display will now be described. The maximum value detecting circuit 27, the contrast control circuit 28 and the brightness control circuit 29 perform the same processing as in Embodiment 3, and the resultant video signal data is inputted to the MAX gamma corrector 40. Then, the video signal data are subjected to subtraction of a data at a predetermined threshold level (i.e., the SH level 1) by the subtracter 401, and the results are compressed at a predetermined ratio by the compressing circuit 402. The video signal data inputted to the MAX gamma corrector 40 are also subjected to subtraction of a data at a predetermined threshold level different from the SH level 1 (i.e., SH level 2) by the subtracter 403, and the results are compressed at a predetermined ratio by the compressing circuit 404. The outputs of the compressing circuits 402 and 404 are added to each other by the adder 405, and the resultant data are inverted by the inverter 406 and sent to the multiplier 31. Accordingly, a fine non-linear compression control can be performed. The subsequent operation thereon is the same as in Embodiment 3 and the description thereof is omitted.

In this above-mentioned embodiment, two different threshold levels are set in the MAX gamma corrector 40. It is, however, needless to say that the invention is applicable to the case where three or more different threshold levels are set.

Embodiment 7

Figure 8:
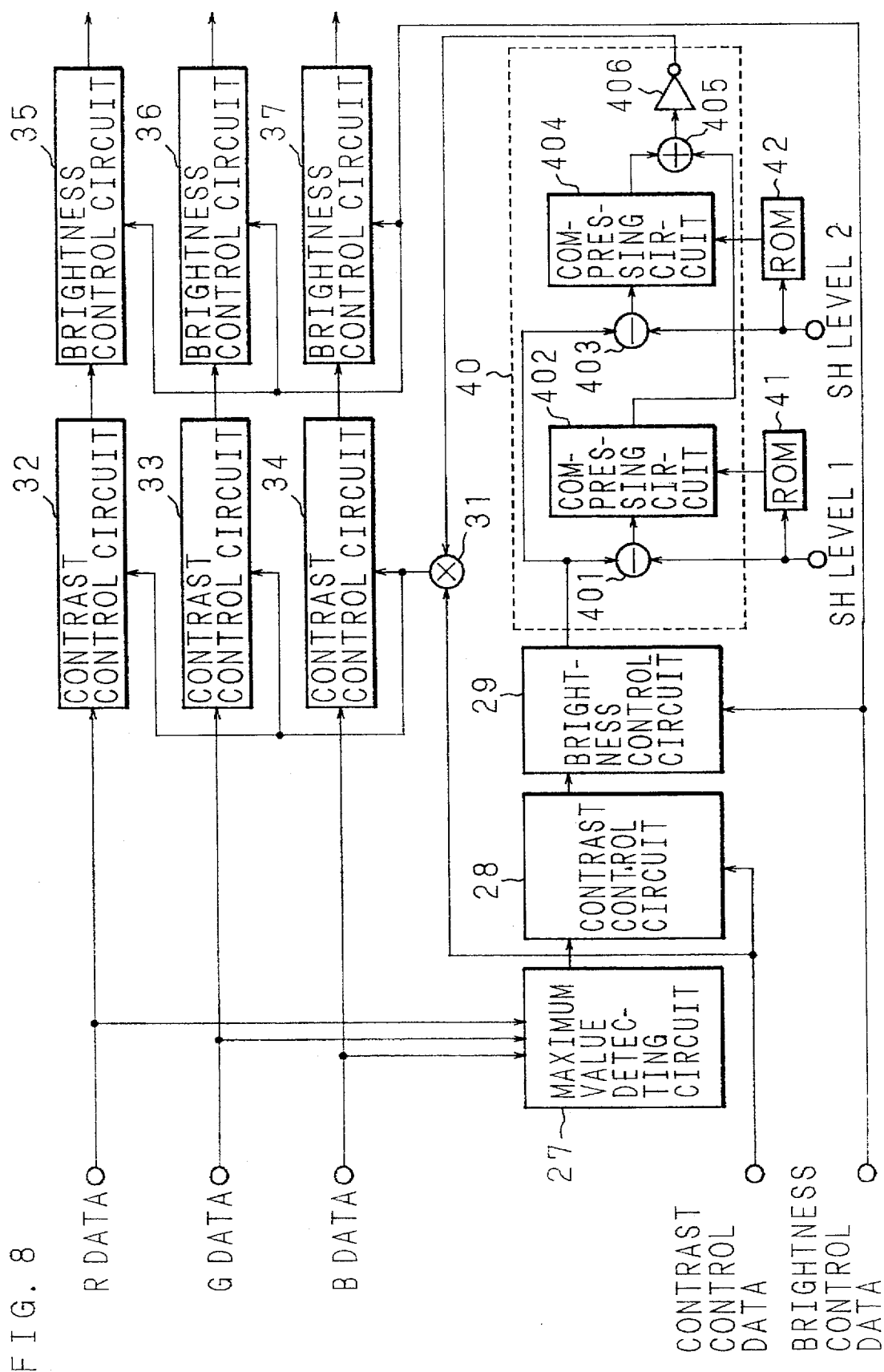
FIG. 8 is a block diagram of the configuration of an image display apparatus according to Embodiment 7 of the invention.

FIG. 8 is a diagram showing the configuration of an image display apparatus according to Embodiment 7 of the invention, wherein like reference numerals are used for like elements and the description thereof is omitted.

In FIG. 8, the numerals 41 and 42 denotes ROMs for generating a compression control data, which output, respectively to the compressing circuits 402 and 404, data on the compression ratio varied depending upon the magnitude of set threshold levels.

The operation of such an image display apparatus will now be described. The differential data outputted from the subtracters 401 and 403 are compressed at a predetermined ratio by the compressing circuits 402 and 404, respectively as in Embodiment 6. At this point, in this embodiment, data for controlling the compression ratio in accordance with the magnitude of the threshold level are generated in each of the ROMs 41 and 42 which respectively receive the SH levels 1 and 2 as the address inputs. The data for controlling the compression ratio are sent to the compressing circuit 402 and 404 for controlling the compression ratio for the differential data. Accordingly, a greater variety of compression control can be performed, and it is possible to have the type of compression correspond to kind of image source. The operation other than this is identical to that in Embodiment 6, and the description is omitted.

As in Embodiment 4, the compression control data outputted from the ROMs 41 and 42 can be data for selecting a compression ratio instead of the compression factor data, and the process can be performed in a microcomputer when it is used for the control of the compression.

Embodiment 8

Figure 9:
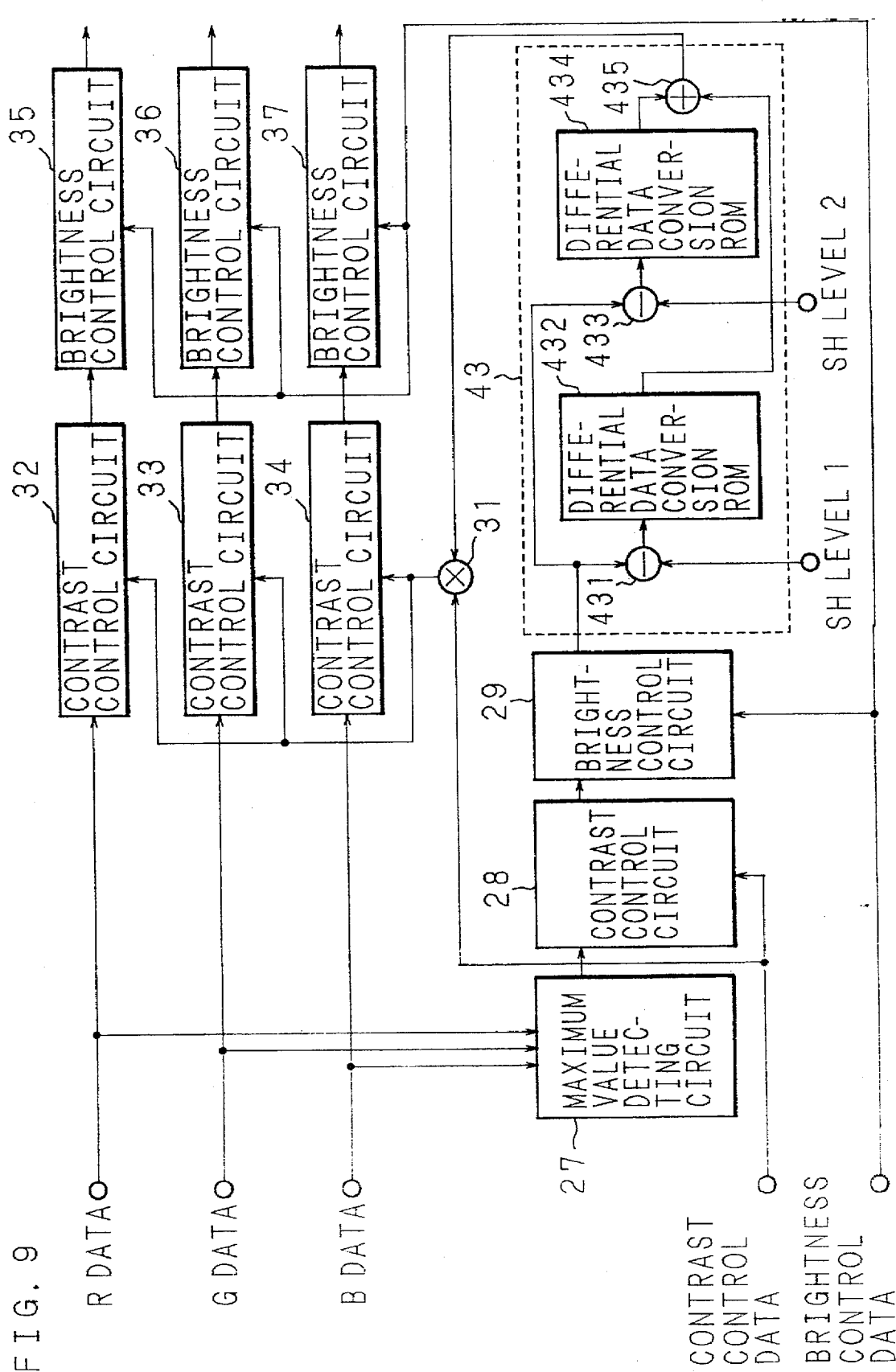
FIG. 9 is a block diagram of the configuration of an image display apparatus according to Embodiment 8 of the invention.

FIG. 9 is a diagram showing the configuration of an image display apparatus according to Embodiment 8 of the invention, wherein like reference numerals are used for like elements and the description thereof is omitted.

In FIG. 9, the numeral 43 denotes a MAX gamma corrector, which has a subtracter 431 for subtracting data at a first threshold level (i.e., SH level 1) from the video signal data outputted from the brightness control circuit 29, a differential data conversion ROM 432 storing a conversion table for converting the output data from the subtracter 431 into predetermined data, another subtracter 433 for subtracting data at a second threshold level (i.e., SH level 2) from the video signal data outputted from the brightness control circuit 29, another differential data conversion ROM 434 storing a conversion table for converting the output data from the subtracter 433 into predetermined data, and an adder 435 for adding the outputs of the differential data conversion ROMs 432 and 434 to each other.

The operation of such an image display apparatus will now be described. The maximum value detecting circuit 27, the contrast control circuit 28 and the brightness control circuit 29 perform the same processing as in Embodiment 3, and the processed video signal data is inputted to the MAX gamma corrector 43. In the MAX gamma corrector 43, the video signal data are subjected to subtraction of data at predetermined threshold levels (i.e., SH levels 1 and 2) by the subtracters 431 and 433, respectively, and the results are sent to the address inputs of the differential data conversion ROMs 432 and 434, respectively. The differential data conversion ROMs 432 and 434 generate corrected data from the received differential data in accordance with the conversion tables stored therein, respectively. The adder 435 adds the two corrected data received from the differential data conversion ROMs 432 and 434 to each other to be sent to the multiplier 31. The subsequent operation thereon is the same as in Embodiment 3 and the description thereof is omitted.

In the above description, two different threshold levels are set in the MAX gamma corrector 43. It is, however, needless to say that the invention is applicable to the case where three or more different threshold levels are set.

Embodiment 9

Figure 10:
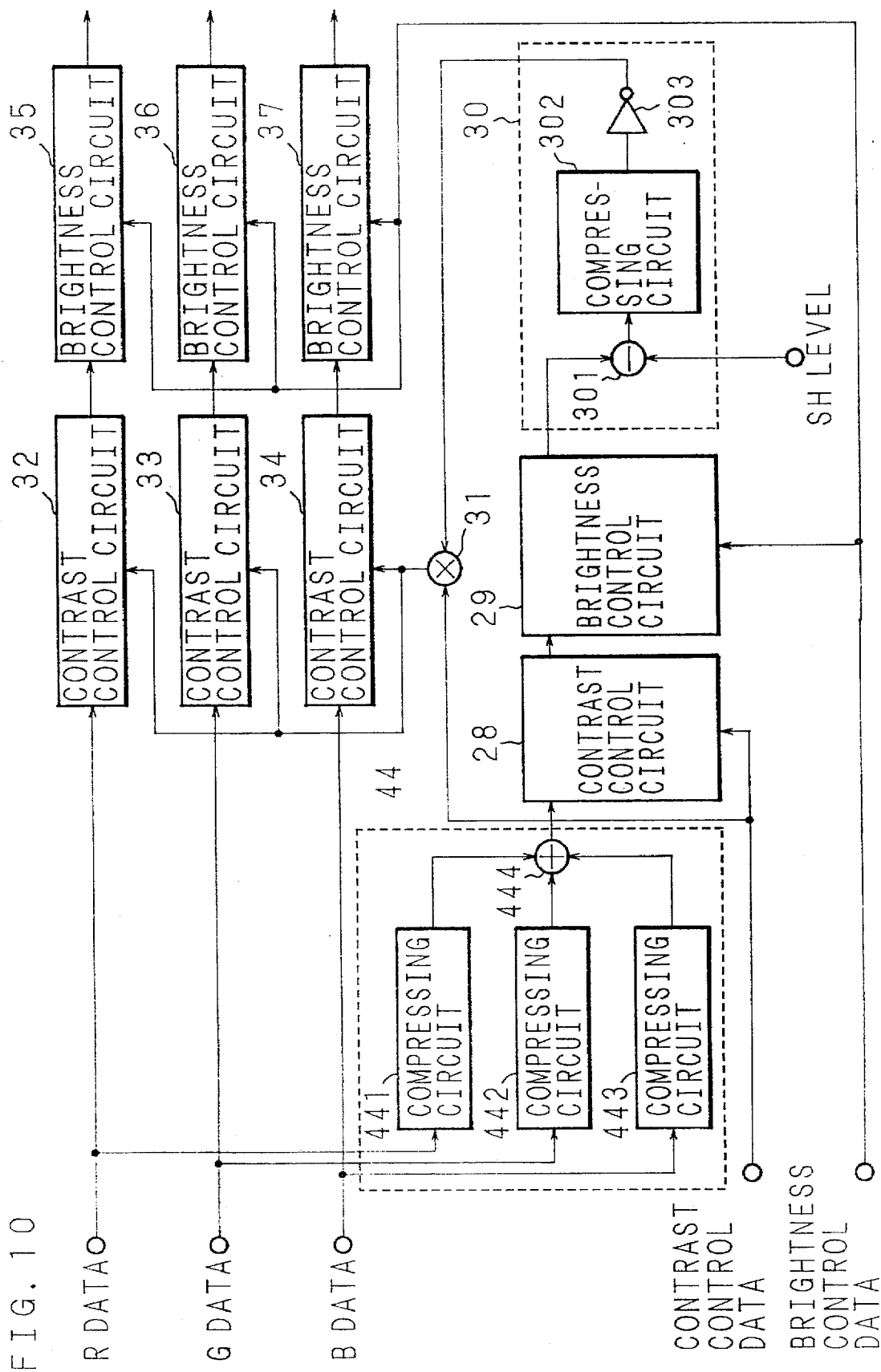
FIG. 10 is a block diagram of the configuration of an image display apparatus according to Embodiment 9 of the invention.

FIG. 10 is a block diagram showing the configuration of an image display apparatus according to Embodiment 9, wherein like reference numerals are used for like elements and the description thereof is omitted.

In FIG. 10, the numeral 44 denotes a white peak generating circuit, which has a compressing circuit 441 for compressing the input video signal data of the R primary color signal, a compressing circuit 442 for compressing the input video signal data of the G primary color signal, a compressing circuit 443 for compressing the input video signal data of the B primary color signal, and an adder 444 for adding the outputs of the compressing circuits 441, 442 and 443 to one another.

The operation of such an image display apparatus will now be described. The video signal data of the respective R, G and B primary color signals inputted to the white peak generating circuit 44 are compressed at a predetermined ratio by the compressing circuits 441, 442 and 443, respectively, and the resultant compressed video signal data are added to one another by the adder 444, thereby generating a white peak signal data, which is a video signal data for enabling the detection of a white peak of an image. The white peak signal data thus generated are sent to the contrast control circuit 28. Then, the white peak signal data are processed by the contrast control circuit 28, the brightness control circuit 29 and the MAX gamma corrector 30 in the same manner as in Embodiment 3. The processing of the white peak signal data in the respective circuits is identical to that of the digital video signal data outputted from the maximum value detecting circuit 27 in Embodiment 3, and the description is herein omitted. Further, the multiplier 31, the contrast control circuits 32, 33 and 34, and the brightness control circuits 35, 36 and 37, all of which are subsequent to the MAX gamma corrector 30, perform the same processing as in Embodiment 3, and the description is also omitted.

Embodiment 10

In Embodiment 9 described above, the maximum value detecting circuit 27 of Embodiment 3 is replaced with the white peak generating circuit 44. Embodiment 9 is, however, merely an illustrative example, and the maximum value detecting circuit 27 of any of Embodiments 4 through 8 can be replaced with the white peak generating circuit 44 of Embodiment 9.

As described above, the present invention provides a gamma corrector having a comparatively small number of gates that causes no variation in the hue in the displayed image. Further, since a plurality of threshold levels can be used, the gamma correction can be performed more smoothly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image display apparatus for displaying R, G and B primary color signals on a display screen, comprising:

means for detecting a primary color signal having a maximum level among digital video signal data of the three primary color signals;

means for adjusting an amplitude level of the maximum primary color signal in accordance with a first control data;

means for adjusting a DC level of the amplitude-adjusted, maximum primary color signal in accordance with a second control data;

means for calculating a level difference between a predetermined threshold level and the level of the video signal data whose amplitude level and DC level have been adjusted;

means for compressing the calculated level differential data at a predetermined ratio to generate ones complement of the compressed level differential data;

means for multiplying the ones complement of the compressed level differential data by the first control data to generate a third control data; and means for adjusting amplitude levels of the video signal data for each of the three primary color signals at a ratio in accordance with the generated third control data.

2. The image display apparatus according to claim 1, wherein the ratio for compressing the level differential data varied depending upon the threshold level.

3. An image display apparatus for displaying R, G and B primary color signals on a display screen, comprising:

means for detecting a primary color signal having a maximum level among digital video signal data of the three primary color signals;

means for adjusting an amplitude level of the maximum primary color signal in accordance with a first control data;

means for adjusting a DC level of the amplitude-adjusted, maximum primary color signal in accordance with a second control data;

means for calculating respective level differences between a plurality of predetermined threshold levels and the level of the video signal data whose amplitude level and DC level have been adjusted;

means for compressing the calculated level differential data at predetermined ratios, respectively, and summing up the compressed level differential data to generate ones complement of the sum of the compressed level differential data;

means for multiplying the ones complement of the sum of the compressed level differential data by the first control data to generate a third control data; and means for adjusting amplitude levels of the video signal data for each of the three primary color signals at a ratio in accordance with the generated third control data.

4. The image display apparatus according to claim 3, wherein the ratios for compressing the level differential data are varied depending upon the plurality of threshold levels.

5. The image display apparatus according to claim 1, further comprising:

means for adjusting DC levels for each of the three primary color signals outputted from said means for adjusting amplitude levels.

6. The image display apparatus according to claim 3, further comprising:

means for adjusting DC levels for each of the three primary color signals outputted from said means for adjusting amplitude levels.

7. An image processing apparatus for processing an image signal having R,G and B color signal components, comprising:

means for deriving a first color signal component from the R, G and B color signal components;

a first contrast control circuit adjusting an amplitude level of the first color signal component at a ratio in accordance with a first control data;

a brightness control circuit adjusting a DC level of the contrast-adjusted color signal component in accordance with a second control data;

a subtracter circuit subtracting a predetermined threshold level from the brightness and contrast adjusted color signal component to generate level-differential data;

a compressing circuit compressing the level-differential data at a predetermined ratio to generate compressed level-differential data;

a multiplier circuit multiplying the compressed level-differential data by the first control data to generate a third control data; and a second contrast control circuit adjusting amplitude levels of the R,G, and B color signal components at a ratio in accordance with the third control data.

8. The image processing apparatus as recited in claim 7, said means for deriving a first color signal component including:

a maximum value detecting circuit detecting a maximum value of the R,G and B color signal components to output the first color signal component.

9. The image processing apparatus recited in claim 8, wherein the ratio for compressing the level-differential data is varied depending upon the threshold level.

10. The image processing apparatus recited in claim 8, said subtracter circuit subtracting a plurality of predetermined threshold levels from the brightness and contrast adjusted color signal component to generate a plurality of level-differential data;

said compressing circuit compressing the plurality of level-differential data at predetermined ratios to generate a plurality of compressed level-differential data;

said apparatus further comprising:

a summing circuit summing the plurality of compressed level-differential data and outputting the result to said multiplier circuit.

11. The image processing apparatus recited in claim 10, wherein the ratios for compressing the level-differential data are varied depending upon the plurality of threshold levels.

12. The image processing apparatus as recited in claim 7, said means for deriving a first color signal component including:

means for obtaining the first color signal component by summing up digital video signal data regarding the R,G and B color signal components at a predetermined ratio.

13. The image processing apparatus recited in claim 12, wherein the ratio for compressing the level-differential data is varied depending upon the threshold level.

14. The image processing apparatus recited in claim 12, said subtracter circuit subtracting a plurality of predetermined threshold levels from the brightness and contrast adjusted color signal component to generate a plurality of level-differential data;

said compressing circuit compressing the plurality of level-differential data at predetermined ratios to generate a plurality of compressed level-differential data;

said apparatus further comprising:

a summing circuit summing the plurality of compressed level-differential data and outputting the result to said multiplier circuit.

15. The image processing apparatus recited in claim 14, wherein the ratios for compressing the level-differential data are varied depending upon the plurality of threshold levels.

16. The image processing apparatus recited in claim 7, further comprising:

a brightness control circuit adjusting DC levels of the R,G, and B color signal components outputted from the second contrast control circuit.

17. A method for adjusting a contrast ratio of R,G and B color signal components of an image, comprising the steps of:

deriving a first color signal component from the R, G and B color signal components;

adjusting an amplitude level of the first color signal component in accordance with a contrast control signal;

subtracting a predetermined threshold level from the contrast adjusted first color signal component to generate level-differential data;

compressing the level-differential data to generate compressed, level-differential data;

generating control data by multiplying the compressed, level-differential data by the contrast control data; and adjusting a contrast ratio of the R, G and B color signal components in accordance with the control data generated by said mulitplying step.

* * * * *